United States Patent [19]

Hevenor et al.

[11] 4,435,674
[45] Mar. 6, 1984

[54] METHOD AND APPARATUS FOR GENERATING A VERIFIED PLOT

[75] Inventors: Charles M. Hevenor, Bolton, Conn.; David L. Wilson, Bowie, Md.

[73] Assignee: The Gerber Scientific Instrument Company, South Windsor, Conn.

[21] Appl. No.: 308,667

[22] Filed: Oct. 5, 1981

[51] Int. Cl.³ .............................................. G05B 1/06
[52] U.S. Cl. ...................................... 318/640; 346/75
[58] Field of Search ................. 318/577, 640; 346/31, 346/75; 400/124

[56] References Cited
U.S. PATENT DOCUMENTS 3,335,287  8/1967  Hargens ............................ 250/227
4,328,504  5/1982  Weber et al. ........................ 346/75
4,339,208  7/1982  Biedermann ....................... 400/124

Primary Examiner—B. Dobeck
Attorney, Agent, or Firm—McCormick, Paulding & Huber

[57] ABSTRACT

An automatically controlled plotter that generates graphic information on recording material in response to a plot program includes an optical sensor for detecting the traces or lines that are generated in the plot on the recording medium. The detected lines are compared with the programmed lines to establish if an omission or gap exists, and where there is a gap, the plotting process is interrupted or the program is repeated to retrace the defective portion of the plot, or the defect can be recorded for subsequent correction.

19 Claims, 8 Drawing Figures

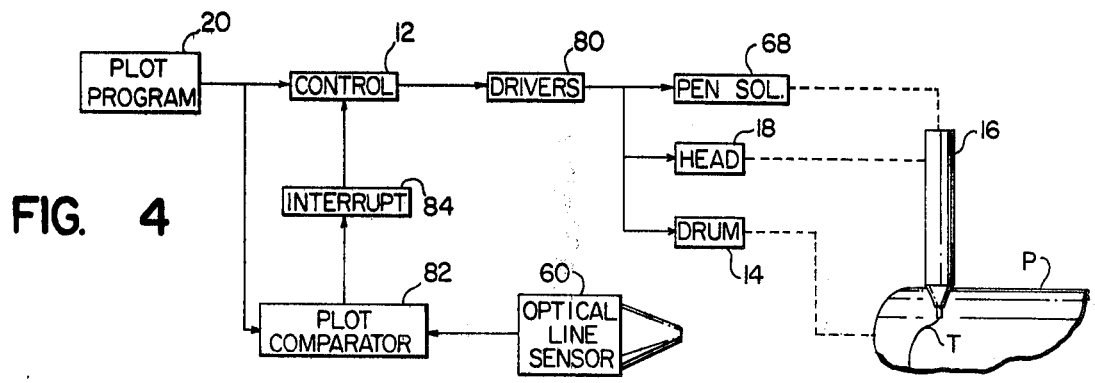
FIG. 4
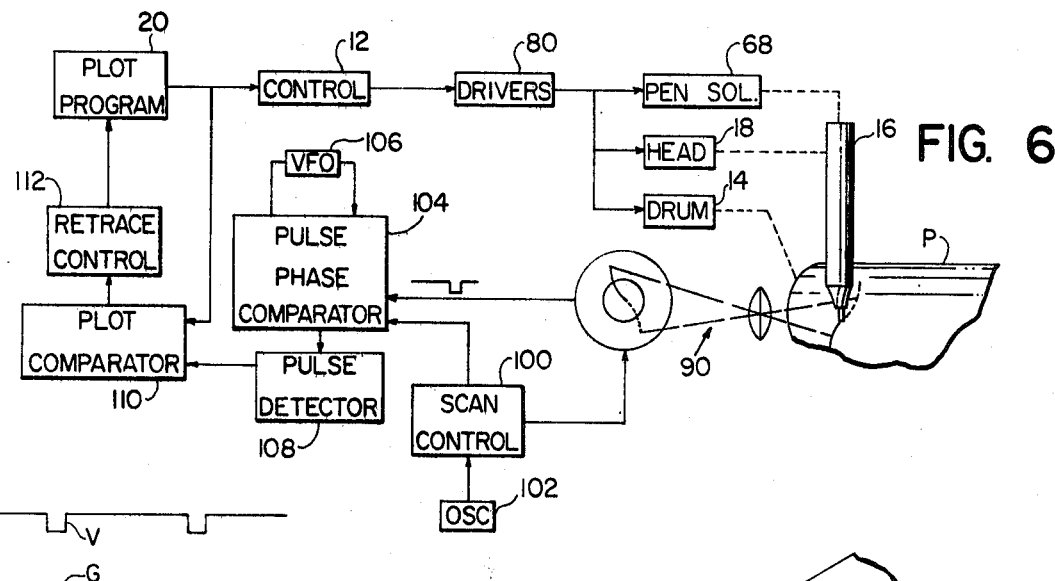
FIG. 6
FIG. 8
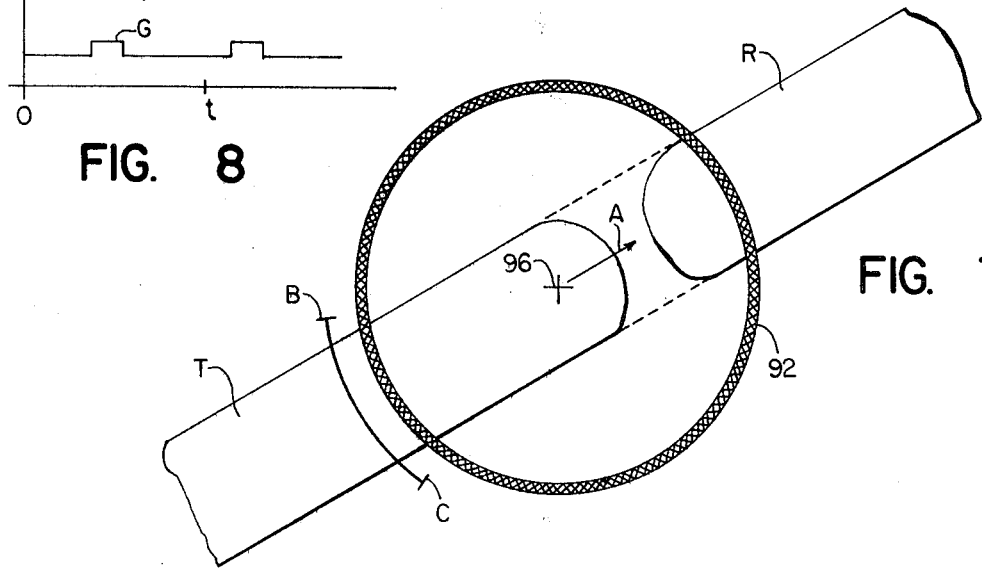
FIG. 7

METHOD AND APPARATUS FOR GENERATING A VERIFIED PLOT

BACKGROUND OF THE INVENTION

The present invention relates to the field of automatically controlled plotters that produce graphic information on a recording medium in response to a plot program. More particularly, the present invention relates to the method and apparatus for verifying the plot produced by a marking instrument with the plot program.

Automatically controlled plotters that utilize marking instruments such as pens, pencils, ink jets and other types of graphic marking instruments sometimes fail to accurately reproduce a programmed plot due to difficulties associated within either delivering or applying the marking material to the plotting paper or other recording medium. Where ink pens are utilized by the plotter, obstructions in the pens or dirt and grease on the paper prevent the ink from flowing freely from the pen onto the paper to produce a continuous, dark line of uniform width and intensity. The problem becomes more prevalent when higher plotting speeds are utilized. In such cases, the plot produced is of poor quality with lines that may have gaps or be badly faded in certain segments. A plot of poor quality may possibly lead to errors in interpretation.

It is accordingly a general object of the present invention to provide method and apparatus for verifying a plot produced on a recording medium with the program from which the plot was generated. It is a further object of the invention to identify defective portions of a plot so that they may be corrected or eliminated from the finished product of the plotting process.

SUMMARY OF THE INVENTION

The present invention resides in a plotting apparatus having a plotting instrument, such as a pen, and a programmable controller for moving the instrument relative to a recording medium in response to plotting commands developed by the controller from a plot program.

The apparatus includes the improvement of plot verifying means for correlating the plot produced by the plotting instrument with the program utilized by the controller. The verifying means includes sensing means, such as an optical sensor, for detecting the presence and absence of marks on the recording medium in those locations where plotted data should exist. Means are provided for moving the sensing means in tracking relationship with the plot on the recording medium while the sensing means detects the presence and absense of marks. The sensing means and the marking means may be mounted on a common carriage so that the same mechanism is controlled by the plot program for both generating and verifying the plot.

Comparator means are connected with the sensing means for comparing the sensed presence and absence of marks in the actual plot on the medium with the plot which is defined in the program. If the comparator means detects that the actual plot and the programmed plot are not consistent with one another, an error signal is produced. The error signal may be used to interrupt the operation, and during the interruption, the defective portion of the plot may either be retraced by the marking instrument or corrected by other means or personnel. Alternatively, the defects may simply be recorded for correction or consideration at a subsequent time.

The apparatus may be employed in various modes of operation. Plotting and sensing the plot can be carried out either simultaneously or in different stages of operation. For simultaneous operation, it is desirable that the sensing means and the marking instrument be mounted coaxially along an axis perpendicular to the plotting material so that a single carriage means and controls may be used.

The marking instrument and the sensing means may be mounted in side-by-side relationship on a common carriage, and in this event, it is generally necessary to carry out the verifying operation subsequent to the plotting operation.

A basic advantage of the invention is the deficiencies associated with the generation of graphic images on the recording medium are eliminated or at least identified in the actual plot for consideration and correction. Furthermore, the invention which produces more accurate plots may be carried out by hardware which, with a few modifications, is the same as that utilized in the past to prepare unverified plots.

BRIEF DESCRIPTION OF THE DRAWINGS

FIG. 4 is a block diagram illustrating the controls for carrying out a plotting and verifying operation in one form.

FIG. 6 is a block diagram illustrating the controls for carrying out the plotting and verifying operation in the embodiment of the invention in FIG. 5.

FIG. 7 is an enlarged fragmentary view of a line plot and illustrates the operation of the embodiment of the invention illustrated in FIGS. 5 and 6.

FIG. 8 is a diagram illustrating the time relationship of gating and gated pulses in the embodiment of the invention in FIGS. 5 and 6.

DESCRIPTION OF THE PREFERRED EMBODIMENTS

Figure 1:
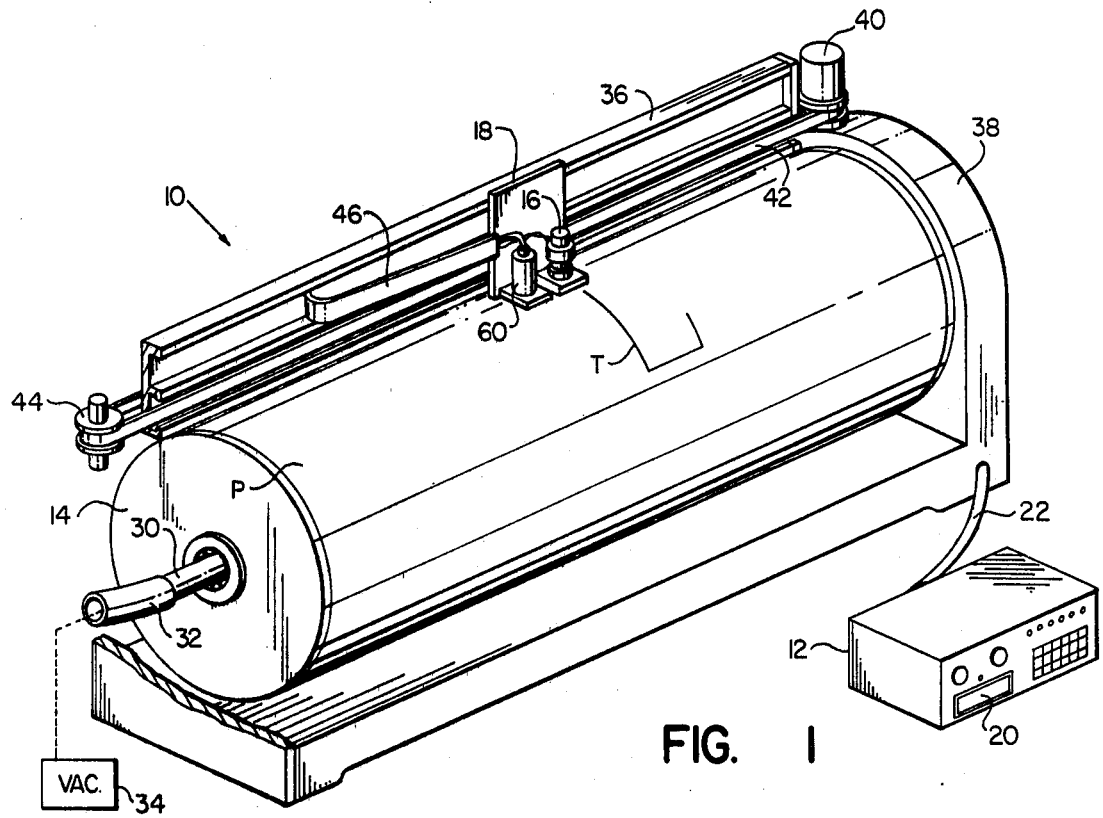
FIG. 1 is a perspective view of the drum plotter in which the present invention is incorporated.
Figure 2:
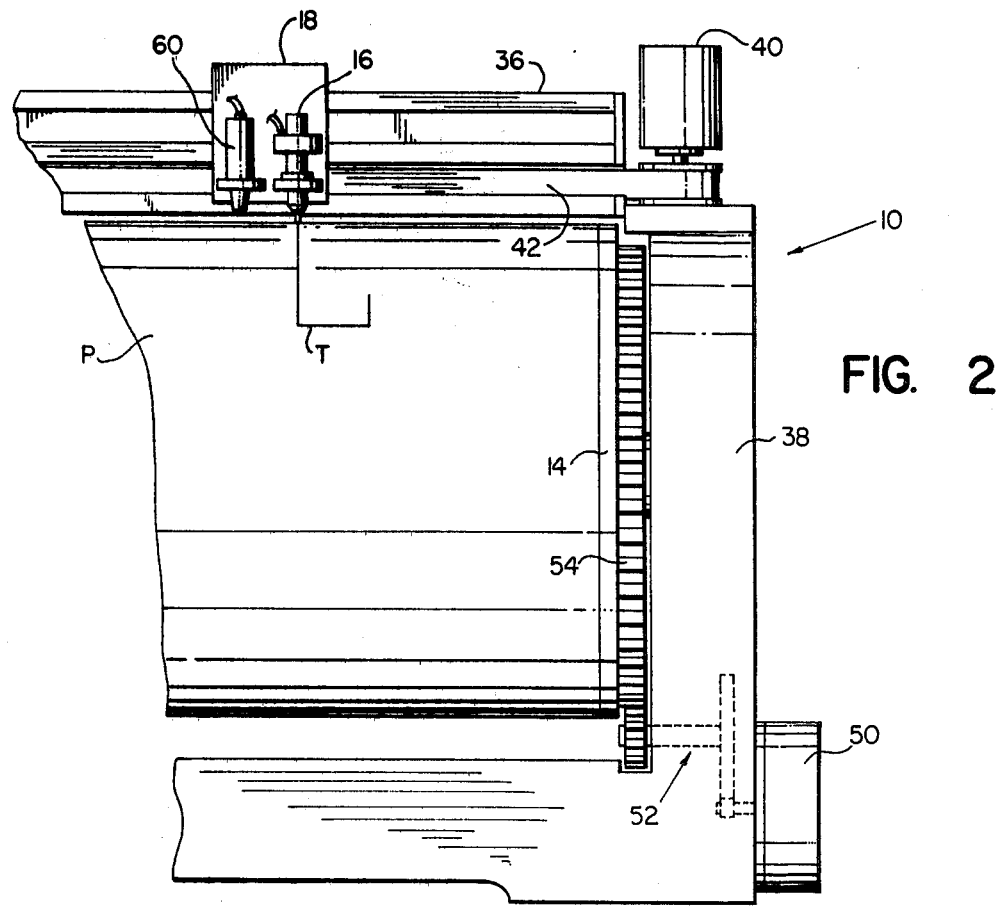
FIG. 2 is a fragmentary front elevation view of the drum plotter in FIG. 1 and shows the drive motors for both the drum and the plotting head.

FIGS. 1 and 2 illustrate a drum plotter, generally designated 10, which is operated by a programmable controller 12 to generate graphic information on a sheet of plotting paper P or other recording medium mounted on the surface of a rotatable plotting drum 14. The graphic information typically is comprised by line traces T that represent mechanical drawings, diagrams, artwork and other types of graphic informaton or data. In the course of a plotting operation, the graphic information is generated on the plotting paper by means of a marking instrument 16 mounted on a movable plotting head 18. The marking instrument, for example, may comprise a pen, pencil, crayon, ink jet, scribe or other instrument which produces a visible or otherwise detectable image on the paper P when the plotting head 18 and the rotatable drum 14 are moved relative to one another and the instrument is activated.

The programmable controller 12 controls the relative movements of the plotting head 18 and the drum 14 in accordance with a plot program that is read from a program tape 20 or other data storage device. The controller 12 develops command signals that are transmitted through a control cable 22 to the drive motors in the plotter for controlling relative movements of the plotting drum 14 and the head 18.

The command signals also include actuating signals that cause the marking instrument 16 to be engaged with the plotting paper or to otherwise be actuated so that detectable line traces and other images are formed on the paper. For example, if the marking instrument 16 is a pen, the actuating signal from the controller may cause the pen to be lowered into engagement with the plotting paper under slight pressure so that the ink is dispensed on the plotting paper as relative motion takes place. By actuating or deactuating the instrument as it moves over the plotting paper, line traces may be interconnected or disconnected depending upon the plot defined by the program tape 20.

In the illustrated plotter 10, the plotting drum 14 has a perforated drum surface and the interior of the drum is evacuated by a vacuum source 34 through a flexible hose 32 and a shaft 30 on which the drum rotates. The pressure differential created between the exposed surface of the plotting paper and the perforated surface of the plotting drum 14 holds the paper in fixed relationship with the drum during plotting. When a plotting operation has been completed, the vacuum source is deenergized and the plotting paper is easily removed. Further description of the drum can be found in U.S. Pat. No. 3,984,747 having the same assignee as the present invention.

The plotting head 18 is mounted for translational motion along a beam 36 fixed between the opposite ends of the drum plotter housing 38. The drive motor 40 for the plotting head 18 is mounted at one end of the beam 40 in fixed relationship to the housing and is connected in driving relationship with the plotting head by means of a toothed drive belt 42 that is supported at the opposite end of the beam 36 from the drive motor by an idler pulley 44. The portion of the housing 38 in which the idler pulley, the adjacent end of the beam 36, the plotting drum 14 and the shaft 30 are supported is broken away for purposes of illustration.

A ribbon cable 46 is supported in an upper channel of the beam 36 and transmits command signals from the controller 12 to the components on the plotting head 18. For example, the cable transmits command signals that activate the marking instrument 16 to generate graphic information on the plotting paper P as the paper an plotting head 18 are moved relative to one another. The cable also transmits information signals back to the controller 12 from the plotting head.

In FIG. 2 another drive motor 50 is provided for controllably rotating the plotting drum 14 and the plotting paper secured to the drum relative to the plotting head 18 in response to the controller 12. The motor 50 is fixably attached to the housing 38 and is connected in driving relationship with the drum 14 by means of a system of gears 52 and a large drive gear 54 secured to the one end of the plotting drum.

It will be understood that through the combined operations of the drive motors 40 and 50, the plotting head 18 and the plotting paper P can be moved relative to one another so that the line traces T can be produced at any location on the paper. Additionally, by selectively actuating the marking instrument 16, various traces can be connected or disconnected to create one or more graphic images on the paper.

Figure 3:
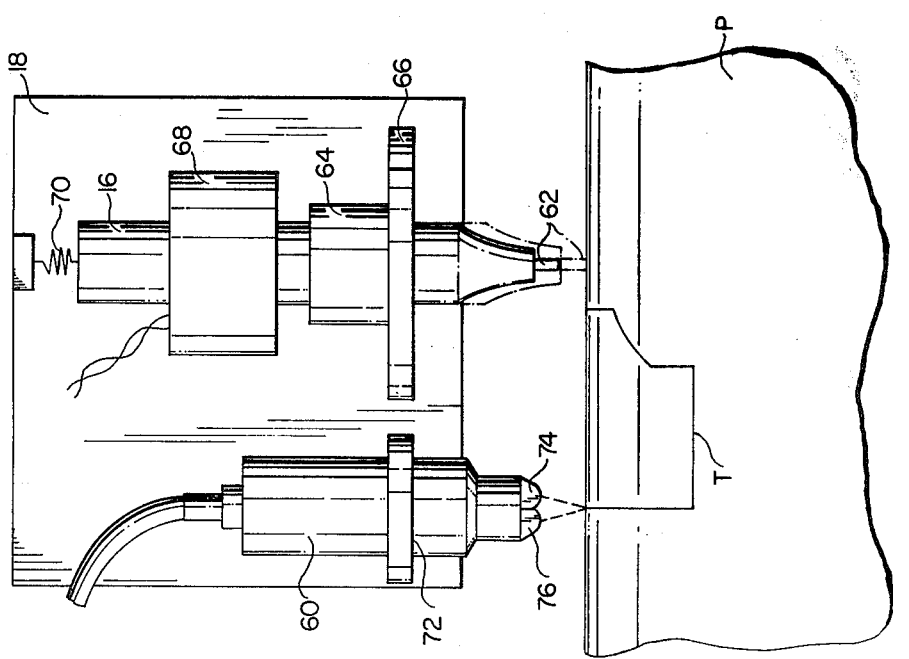
FIG. 3 is an enlarged fragmentary view of the plotter showing the plotting head and the recording medium on the plotting drum in one embodiment of the invention.

In accordance with the present invention, the plotter 10 includes apparatus for verifying the actual plot produced by the marking instrument on the plotting paper P against the programmed plot as defined in the program tape 20. For this purpose, an optical sensor 60 in FIGS. 1-3 is also mounted on the plotting head so that the instrument can be moved in tracking relationship with line traces on the plotting paper as the plot program is replayed after all or a portion of the plot has been generated by the marking instrument on the paper. The optical sensor 60 detects gaps or faded portions of the traces as the plot is retraced and produces signals to identify defective portions of the plot.

FIG. 3 illustrates the plotting head 18 with a marking instrument 16 and the optical sensor 60 in one embodiment of the invention. The marking instrument is illustrated as a wet ink pen that is actuated between the elevated or lifted position illustrated, in which the pen tip or nib 62 is out of contact with the paper P, and a lowered position (illustrated in phantom) in which the tip is in contact with the paper to generate the line traces. The pen is slidably mounted in a sleeve 64 with the pen axis extending generally perpendicular to the plotting paper at the intersection of the axis and the paper. The sleeve 64 is secured to a stationary support platform 66 attached to the head, and a solenoid 68 electrically actuated by the controller 12 pulls the pen downwardly into contact with the plotting paper in opposition to the resilient restraint of a return spring 70. When the solenoid is deactuated, the spring 70 returns the pen to the illustrated, elevated position.

The optical sensor 60 is mounted in fixed relationship to the plotting head 18 by another platform 72. The sensor in one form is a high resolution optical reflective sensor that includes a small light source 74, such as an LED with a combined lens sytem, and a photodiode 76 including a filtered lens system. The sensor 60 is mounted on an axis intersecting the plotting paper in perpendicular relationship and parallel to the axis of the writing instrument 16 so that light from the source 74 adjacent one side of the axis is focused on the plotting paper immediately below the sensor and the light reflected from the plotting paper is received and detected by the photodiode 76 adjacent the other side of the axis. One commercially available sensor of this type is sold by Hewlett Packard Components as a Reflective Sensor Model HEDS-1000. Other types of photo detectors may also be used.

In operation, the light source 74 is energized during a verifying operation and illuminates a limited area of the plotting paper directly below the sensor. The lens system of the photodiode 76 is focused to view the limited area illuminated by the source and includes a chromatic filter to accept reflected light from the LED source but reject other ambient light reflected from the paper and surroundings. If the line trace in the limited area illuminated by the source 74 is continuous, dark and has a substantially uniform width and intensity, the photodiode 76 receives a low level of reflected light and produces a corresponding low light level signal. However, if the trace within the illuminated area viewed by the photodiode contains a gap or is faint, too light or too narrow, the photodiode receives a higher level of reflected light and produces a higher level signal which identifies a defect in the inspected segment of the trace.

To inspect the entire plot for defects, the plot program on the program tape 20 is replayed and controls the relative motions of the plotting head 18 and the plotting paper 14. A fixed offset signal equivalent to the separation between the axes of the optical sensor 60 and the marking instrument 16 is introduced into the command signals transmitted to the drive motor 40 for the plotting head to assure that the optical sensor 60, rather than the instrument 16, overlies the actual traces produced on the paper, and the locus of points viewed by the sensor at the intersection of the optical axis and the medium corresponds to the programmed lines of the plot. The sensor 60 thus scans the actual traces and identifies those locations where defects exist. The scanning steps can be carried out after the entire plot has been generated, or on individual portions of the plot between stages of the plotting operation.

FIG. 4 illustrates an exemplary control system for the plotter 10 with the verifying apparatus. The plot program tape 20 supplies to the controller 12 data defining the graphic features of a plot desired on the plotting paper P. The controller generates command signals which are shaped and converted into physical movements by the drivers 80 consisting of amplifiers and drive motors for the plotting drum 14, the head 18 and the pen solenoid 68. After a plot has been generated on the paper P, the plot program is replayed by the controller 12 with the optical sensor 60 energized instead of the pen or marking instrument 16. A fixed offset is introduced into the motions of the plotting head 18 so that the sensor 60 retracks the line traces T rather than the marking instrument 16.

As the line traces T are retracked by the sensor 60, output signals from the sensor are supplied to a plot comparator 82 in conjunction with the data signals from the plot program tape 20 which, during plotting, actuates the marking instrument into a lowered position or active condition. If there are no defects in the line traces, the actuating signals from the plot program will correspond with the low light level signals of the sensor 60. In other words, when a pen-down signal exists as the head and drum are moved relative to one another, the optical sensor 60 should detect a dark line on the plotting paper and produce a low level output signal. The plot comparator 82 compares the actuating signal from the program tape with the output signal from the sensor, and as long as the signals correspond, the verifying process continues uninterrupted. However, when a gap or other defect occurs in a line trace and the optical sensor produces a higher level signal in the presence of a pen-down signal, the plot comparator 82 detects the lack of correspondence between the signals and transmits an error signal to an interrupt circuit 84. The interrupt circuit transmits a further signal to the controller 12 and the verifying process is stopped with the optical line sensor over or closely adjacent to the detected defect. The defect may then be corrected by the machine operator or by reactivating the plotter to retrace the defective portion of the plot with the marking instrument in the activated condition. Alternatively, the interrupt circuit 84 may be replaced by a recording device which notes the coordinates of the defect for correction at a subsequent point in time.

Figure 5:
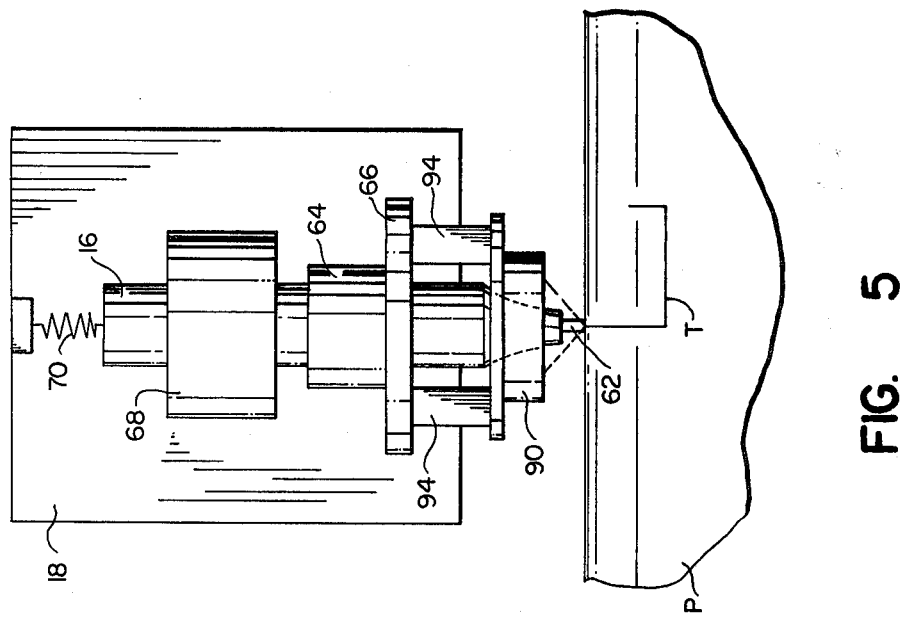
FIG. 5 is an enlarged fragmentary view of the plotter showing the plotting head and a portion of the recording medium on the plotting drum in another embodiment of the invention.

FIG. 5 illustrates another embodiment of the verifying apparatus in which the optical sensor 90 is mounted coaxially of the marking instrument 16 to carry out the plotting and verifying operations substantially simultaneously. In this embodiment, the optical sensor is comprised by a plurality of discrete photosensitive sensing units arranged in a circular array and a lens system associated with the sensing units to collectively focus the units on a small annular area of the plotting paper surrounding the tip 62 of the pen or other instrument. FIG. 7 illustrates an enlarged segment of a line trace T on which a shaded annular area 92 is superimposed to represent the area viewed by the sensor 90.

The sensor is supported below the platform 66 on a plurality of struts 94 in FIG. 5 so that the annular area 92 in FIG. 7 falls within a limited region surrounding the pen and is located coaxially of the pen axis which intersects the plotting paper in perpendicular relationship at point 96. The photosensitive units are small charge coupling devices in the range of 2 mils in width, which when arranged in an array, can be scanned to detect the light level from discrete increments respectively of the annular area in the view of the units. Sensing devices utilizing a plurality of such discrete sensing units or pixels in an array are manufactured by Reticon Corporation of Sunnyvale, Calif.

Alternatively, the sensor may include a bundle of optical fibers arranged in a circular array at one end of the bundle adjacent the plotting paper and arranged at the opposite end in a conventional linear array for scanning. Alternating fibers in the circular array may be connected at the opposite end of the bundle with a source of illumination to project light directly onto the plotting surface at the location being viewed by the remaining fibers in the bundle, or a separate array within or outside the array of viewing fibers may also be employed for illumination.

Operation of the verifying apparatus utilizing the annular optical sensor 90 in FIG. 5 may be accomplished with the control apparatus illustrated in FIG. 6. In the course of a plotting operation while the controller 12 causes the plotting head 18 and drum 14 to move the plotting paper and the actuated marking instrument 16 relative to one another to produce line traces in accordance with the plot program tape 20, the optical sensor 90 is also activated and the plurality of sensing units detects light reflected from the annular area 92 on the plotting paper. Certain of the sensing units in the array sense high levels of light from those portions of the area 92 which contain no line trace and produce high level signals; however, those units which sense light reflected from the area overlying the trace T, detect low light levels and produce a corresponding low level signal.

The outputs of the discrete sensing units are periodically scanned by a scan control 100 at a rate determined by a reference oscillator 102 and are read by a pulse comparator 104 and a pulse detector 108. The oscillator operates at a frequency that insures a reading of all of the units in the array within a period of time that is small compared to an increment of the trace, such as one line width, tracked by the sensor at maximum feed rate. As long as the line trace is of good quality, the sequence of output signals in each scan cycle includes a high level region, which corresponds to the sectors of the area 92 where no trace is seen, and a low level region which corresponds to the sector where a trace is seen. Together the high and low level signals define a verifying pulse that can be manifested from the sequence of signals by an envelope detector. One apparatus for detecting a pulse from a signal sequence is disclosed in greater detail in U.S. Pat. No. 4,204,145 and may form a part of the phase comparator 104. As long as verifying pulses are processed through the phase comparator to the detector 108, the detector transmits a confirming signal to the plot comparator 110. When the plot comparator fails to receive a confirming signal from the detector 108 and the program tape 20 indicates to the comparator that a line trace should appear in the plot being tracked, an error signal is transmitted to a retrace control 112 for corrective action.

Continuous monitoring of the verifying pulses from the scanned sensing units is carried out in the pulse phase comparator 104 which includes means for tracking the shifting phase of the pulses as the line trace moves to different sectors of the scanned area 92. In this respect, the pulse phase comparator is a self-regulating component and includes gating circuits which establish a time gate or "window" in each scan cycle during which the verifying pulse from the optical sensor 90 is expected and observed. The time gate is shifted by means of a variable frequency oscillator 106 in response to the phase of the pulse in the preceding scan cycle so that the pulses are maintained substantially at the center of the gate.

FIG. 8 is a timing diagram showing the relationship between verifying pulses V and the time gates G during scan cycles having a period t. The gate may be wider or narrower than the verifying pulse as long as it is possible to follow the shifting phase of the pulse with the time gate. One pulse phase comparator of this type is disclosed in greater detail in U.S. Pat. No. 3,529,084.

The purpose of the pulse phase comparator 104 is to restrict the period of the scan cycle during which a verifying pulse from the sensor 90 can be sensed by the detector 108. For example, if the sensor is tracking a line trace T in FIG. 7 in the direction of the arrow A, and the plot program dictates that the trace T is to be connected with the trace R, the scanned area 92 of the sensor eventually moves over both traces T and R as illustrated, and pulses are generated for both of the traces. Since it is only the trace T that is being verified at the moment, it is necessary to establish a limited time gate identified by the arc BC in FIG. 7 during which a detected pulse will be accepted by the pulse detector 108 as an indication that the trace has been formed free of defects. The gating circuits in the pulse phase comparator 104 block the pulse from the trace R and elsewhere on the area 92 outside the arc BC, and in conjunction with the oscillator 106, continually shift the time gate and arc BC to a centered position relative to the trace T to eliminate erroneous signals attributed to other traces or marks on the plotting paper. Thus, as the orientation of the line trace T shifts relative to the scanned area 92, the arc BC automatically shifts with the trace.

Alternatively, the gating circuits in the pulse phase comparator 104 which produce the time gate BC in FIG. 7 may be replaced by a predictor circuit, or more aptly, a dedicated microprocessor responsive to the plot program to perform an analysis of the program and the actual movements of the plotting pen and paper. From the analysis an accurate determination of the time interval during which a signal from the sensor 90 should be present can be made, and occurrence of the signal at that time verifies the accuracy of the actual plot.

As long as the trace T is free of defects, the pulse phase comparator 104 transmits the pulses within the time gate to the pulse detector 108 which may be comprised by a timing circuit that is held in a latched condition by the detected pulses. Under no defect conditions, the detector 108 transmits a confirming signal to the plot comparator 110 which also receives a trace or pen-down signal from the plot program tape 20 to indicate that the marking instrument 16 is supposed to be producing a trace on the plotting medium. As long as the plot comparator detects a coincidence of the signals from the plot program and the pulse detector 108, the plotting operation continues uninterrupted. In the event that a gap in the line trace T arises, however, the pulse detector 108 terminates the confirming signal to the comparator 110 and the comparator sends an error signal to the retrace control 112. At that point, the program tape 20 is stopped and reversed a fixed amount before the plotting program is resumed. In this manner, the line trace T is retraced to fill in the defect.

In each of the embodiments of the verifying apparatus disclosed above, the plot is inspected only at points where the optical axis of the sensor intersects the plotting paper. In the embodiment of FIGS. 3 and 4 the sensor is physically located on the optical axis for this purpose. In the embodiment of FIGS. 5–7, the sensor is disposed circumaxially about the optical axis with the pen on the axis, but the time gate BC ensures that the points inspected are those that lay at the intersections of the optical axis and the plotting paper.

In summary, a method and apparatus have been disclosed for verifying plots produced on a recording medium by a marking instrument. The verification correlates data defining a plot in a program with the actual plot generated. The verification can be carried out simultaneously with the plotting operation or as a separate process after the actual plot has been produced.

While the present invention has been described in several embodiments, it should be understood that numerous modifications and substitutions can be made without departing from the spirit of the invention. For example, the marking instrument may include pencils, crayons, chalk, brushes and devices such as ink jets which do not actually make contact with the recording medium as the traces are generated. Instead of interrupting a plotting operation and retracing or otherwise correcting the defects detected, the defects can be reached in a memory provided for that purpose for subsequent correction or elimination. Further, separate marking devices such as liquid or powder dispensers may be actuated when a defect in a trace is detected to mark the region of the plot where the defect exists. Other types of control systems and sensors may be employed to perform the verifying operation. The control system may include intensity controls for varying the sensitivity of the optical sensor and to discriminate between lines of different thicknesses or densities. The invention can be employed in flat bed and other plotters as well as drum plotters, and the verifying process can be carried out on a separate machine from the plotting process using the same or a similar program. Accordingly, the present invention has been described in several embodiments by way of illustration rather than limitation.

We claim:

1. In a plotting apparatus having a plotting instrument, a programmable controller, and means for moving the plotting instrument in line marking relationship to a recording medium in response to plotting commands received from the controller to produce an actual plot on the recording medium corresponding to a plot program in the controller, the instrument being in the form of a marking instrument moved into contact with a recording medium where line marks are programmed for generation of marks and moved out of contact with the recording medium where no marks are programmed, the plot program including instrument command signals for moving the instrument into and out of contact with the medium, the improvement comprising plot verifying means including a sensing means movable relative to the recording medium for detecting the presence and absence of marks on the recording medium, the sensing means having a sensing axis extending generally perpendicular to the recording medium and being responsive to the presence or absence of marks on the recording medium at the locus of points where the axis of the movable sensing means and the recording medium intersect, means for moving the axis of the sensing means in tracking relationship to the actual plot on the recording medium while the sensing means detects the presence and absence of marks on the medium, comparator means connected with the sensing means and responsive to the instrument command signals in the plot program for comparing the sensed presence and absence of marks in the actual plot on the recording medium with the plot defined in the program and producing an error signal when the actual plot and the programmed plot are not consistent with one another.

2. In a plotting apparatus having a plotting instrument and a programmable controller, the improvement of claim 1 further including means connected to the comparator means for interrupting the operation of the controller in response to an error signal.

3. In a plotting apparatus having a plotting instrument and a programmable controller, the improvement of claim 1 further including retracing control means connected with the comparator means for retracing a portion of the program on the recording medium in response to an error signal.

4. In a plotting apparatus, the improvement of claim 1 wherein the sensing means is an optical sensor, and both the plotting instrument and the optical sensor are suspended from the means for moving for movement relative to the recording medium in plotting and verifying operations.

5. The improvement of claim 4 wherein the means for moving comprises a carriage movable relative to the recording medium; and the optical sensor and the plotting instrument are mounted in side-by-side relationship on the carriage.

6. The improvement of claim 4 wherein the means for moving comprises a plotting carriage movable parallel to the recording medium; the sensing axis of the sensing means is an optical axis of the optical sensor; the plotting instrument has a marker axis; and the optical sensor and the plotting instrument are mounted on the plotting carriage with the optical and marker axes coaxial and generally perpendicular to the recording medium.

7. The improvement of claim 1 wherein the marking instrument is a pen.

8. Apparatus for producing verified plots of graphic information comprising:
support means for holding a recording medium with a plotting surface exposed for receiving graphic information in a plotting operation;
a plotting head having a marking instrument with a marking axis intersecting the recording medium in perpendicular relationship and movable into and out of contact with the medium for generating graphic information comprised by continuous line traces on the exposed surface of the recording medium along a continuous line of contact with the medium;
carriage means for moving the plotting head and recording medium relative to one another in two coordinate directions to generate continuous traces extending in each direction and at angles thereto on the exposed surface of the medium;
programmed control means connected with the carriage means and plotting head for causing the plotting head to generate the continuous line traces on the recording medium in accordance with a given plot program;
optical sensing means mounted on the carriage means and having an optical axis intersecting the recording medium in perpendicular relationship for sensing line traces plotted on the recording medium at any location intersected by the optical axis; and
comparator means connected with the optical sensing means and responsive to the plot program in the programmed control means for verifying the presence and absence of a line trace on the recording medium at locations intersected by the optical axis and as sensed by the optical sensing means.

9. Apparatus for producing verified plots as defined in claim 8 wherein the plotting head with the marking instrument and the optical sensing means are both mounted on a common carriage of the carriage means for movement over the recording medium in response to the plot program of the programmed control means.

10. Apparatus as defined in claim 9 wherein the marking instrument and the optical sensing means are mounted in side-by-side relationship on the common carriage with the marking axis and the optical axis in parallel relationship.

11. Apparatus as defined in claim 9 wherein the marking instrument and the optical sensing means are mounted on the common carriage with the marking axis and the optical axis coaxial of one another.

12. Apparatus for producing verified plots as defined in claim 8 wherein the optical sensing means comprises an optical sensor having a light source and a photodiode mounted adjacent one another on the axis for detection of graphic information along the axis.

13. Apparatus for producing verified plots as defined in claim 8 wherein the optical sensing means has an optical sensor located on the optical axis.

14. Apparatus for producing verified plots as defined in claim 8 wherein the optical sensing means has an annular optical sensor mounted coaxially of the optical axis and scanning means associated with the annular sensor for periodically interrogating the sensor.

15. A method of generating a verified plot of lines on a recording medium comprising:
reducing desired lines of a plot to machine-readable data defining a plot program;
reading the data of the plot program through a data controller;
controllably moving a contacting-type marking instrument and the recording medium relative to one another along line of plot extending in two coordinate directions in response to the data read by the controller from the plot program;
causing the marking instrument to move into contact with and produce marks on the recording medium corresponding to the lines of plot during the step of controllably moving the marking instrument along the lines of plot;

controllably moving the recording medium and an optical sensor having a sensitive optical axis intersecting the recording medium relative to one another in two coordinate directions in response to the data read by the controller from the plot program, the optical sensor being positioned during movement to cause the optical axis to intersect the medium along the lines of plot; and detecting defects in the marks produced on the recording medium by the marking instrument through the optical sensor during the step of controllably moving the sensor by comparing the marks detected by the sensor at the intersection of the optical axis and the recording medium with the desired lines of plot in the plot program to correlate the produced plot with the program.

16. A method of generating a verified plot as defined in claim 15 wherein the marking instrument and the optical sensor are mounted on a common carriage for controlled movement, and the steps of controllably moving the optical sensor and detecting the defects are performed simultaneously.

17. A method of generating a verified plot as defined in claim 15 wherein the step of controllably moving the marking instrument is performed at a different time from the steps of controllably moving the optical sensor and detecting the defects.

18. A method of generating a verified plot of lines as defined in claim 15 including additional step of correcting the produced plot in response to defects identified in the step of detecting.

19. A method of generating a verified plot as defined in claim 15 wherein the step of comparing includes the step of identifying the differences between the detected marks and the desired lines of plot in the plot program; and an additional step in the method comprises controllably moving the marking instrument and causing the instrument to produce marks on the recording medium for those segments of the plot where the differences are identified.

* * * * *